(12) United States Patent
Bihani et al.

(10) Patent No.: US 9,864,759 B2
(45) Date of Patent: *Jan. 9, 2018

(54) SYSTEM AND METHOD FOR PROVIDING SCATTER/GATHER DATA PROCESSING IN A MIDDLEWARE ENVIRONMENT

(75) Inventors: Ballav Bihani, Fremont, CA (US); Patrik Torstensson, Stockholm (SE); Adam Messinger, San Francisco, CA (US); Naresh Revanuru, Fremont, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 595 days.

This patent is subject to a terminal disclaimer.

(21) Appl. No.: 13/170,490

(22) Filed: Jun. 28, 2011

(65) Prior Publication Data

US 2012/0066460 A1 Mar. 15, 2012

Related U.S. Application Data

(60) Provisional application No. 61/383,285, filed on Sep. 15, 2010, provisional application No. 61/384,227, filed on Sep. 17, 2010.

(51) Int. Cl.
*G06F 12/00* (2006.01)
*G06F 17/30* (2006.01)
(Continued)

(52) U.S. Cl.
CPC .. *G06F 17/30286* (2013.01); *G06F 15/17318* (2013.01); *G06F 17/30368* (2013.01);
(Continued)

(58) Field of Classification Search
CPC ... H04L 67/1002; H04L 9/085; H04L 5/0053; H04L 29/06; H04L 41/042; H04L 49/358;
(Continued)

(56) References Cited

U.S. PATENT DOCUMENTS

| 5,109,384 A | 4/1992 | Tseung |
| 5,333,274 A * | 7/1994 | Amini et al. .................. 714/50 |

(Continued)

FOREIGN PATENT DOCUMENTS

| CN | 101159539 | 4/2008 |
| CN | 101408899 A | 4/2009 |

(Continued)

OTHER PUBLICATIONS

Gregory F. Pister, High Performance Mass Storage and Parallel I/O, 2002, Chapter 42—An Introduction to the InfiniBand Architecture, IBM Enterprise Server Group, pp. 617-632.*

(Continued)

*Primary Examiner* — Anthony Mejia
*Assistant Examiner* — Schquita Goodwin
(74) *Attorney, Agent, or Firm* — Tucker Ellis LLP (57) ABSTRACT

Systems and methods are provided for providing scatter/gather data processing. In accordance with an embodiment, a such a system can include a cluster of one or more high performance computing systems, each including one or more processors and a high performance memory. The cluster communicates over an InfiniBand network. The system can also include a middleware environment, executing on the cluster, that includes one or more application server instances. The system can further include a plurality of muxers. Each application server instance includes at least one muxer, and each muxer is operable to collect data from a plurality of locations in the high performance memory, and transfer the data in bulk.

21 Claims, 4 Drawing Sheets

(51) Int. Cl.
  *H04L 29/06* (2006.01)
  *G06F 15/173* (2006.01)
  *H04L 12/24* (2006.01)
  *H04L 12/931* (2013.01)
  *H04L 29/08* (2006.01)
  *G06F 9/455* (2006.01)

(52) U.S. Cl.
  CPC .. *G06F 17/30584* (2013.01); *H04L 29/06088* (2013.01); *H04L 41/042* (2013.01); *H04L 41/0686* (2013.01); *H04L 49/358* (2013.01); *H04L 67/02* (2013.01); *H04L 67/10* (2013.01); *H04L 67/1002* (2013.01); *H04L 67/1034* (2013.01); *H04L 67/1095* (2013.01); *H04L 67/142* (2013.01); *H04L 67/146* (2013.01); *G06F 9/45504* (2013.01); *H04L 67/1004* (2013.01); *H04L 67/1027* (2013.01); *H04L 67/14* (2013.01)

(58) Field of Classification Search
  CPC ......... H04L 67/10; G06F 17/30; G06F 9/544; G06F 13/28; G06F 3/00; G06F 17/30914; G06F 17/30961; G06F 15/17318; H04W 28/10; H04J 14/0227
  USPC ............. 709/223, 250, 232, 216, 206, 227; 710/22; 326/39; 707/104.1; 714/50; 370/338, 466, 335; 385/24; 719/328
  See application file for complete search history.

(56) References Cited

U.S. PATENT DOCUMENTS

| | | | |
|---|---|---|---|
| 6,192,389 B1 | 2/2001 | Ault | |
| 6,427,161 B1 | 7/2002 | LiVecchi | |
| 6,895,590 B2 | 5/2005 | Yadav | |
| 6,938,085 B1 | 8/2005 | Belkin et al. | |
| 7,394,288 B1* | 7/2008 | Agarwal | G06F 15/7867 326/39 |
| 7,554,993 B2 | 6/2009 | Modi et al. | |
| 7,765,307 B1* | 7/2010 | Kritov | H04L 69/14 709/227 |
| 7,831,731 B2 | 11/2010 | Tang | |
| 7,991,904 B2 | 8/2011 | Melnyk et al. | |
| 8,130,776 B1 | 3/2012 | Sundararajan | |
| 8,131,860 B1 | 3/2012 | Wong et al. | |
| 8,578,033 B2 | 11/2013 | Mallart | |
| 8,601,057 B2 | 12/2013 | Han | |
| 9,454,444 B1 | 9/2016 | Agarwal | |
| 2002/0097954 A1* | 7/2002 | Maeno | H04J 14/0227 385/24 |
| 2002/0174136 A1 | 11/2002 | Cameron et al. | |
| 2003/0014480 A1 | 1/2003 | Pullara et al. | |
| 2003/0078958 A1 | 4/2003 | Pace et al. | |
| 2003/0088713 A1* | 5/2003 | Mandal | G06F 9/5016 719/328 |
| 2003/0093499 A1 | 5/2003 | Messinger | |
| 2003/0110232 A1 | 6/2003 | Chen | |
| 2003/0120822 A1 | 6/2003 | Langrind et al. | |
| 2004/0122953 A1 | 6/2004 | Kalmuk | |
| 2004/0177126 A1 | 9/2004 | Maine | |
| 2004/0205771 A1 | 10/2004 | Sudarshan et al. | |
| 2004/0225671 A1* | 11/2004 | Carroll | G06F 17/30563 |
| 2005/0021354 A1 | 1/2005 | Brendle et al. | |
| 2005/0027901 A1* | 2/2005 | Simon et al. | 710/22 |
| 2005/0038801 A1 | 2/2005 | Colrain et al. | |
| 2005/0094577 A1 | 5/2005 | Ashwood-Smith | |
| 2005/0102412 A1 | 5/2005 | Hirsimaki | |
| 2005/0223109 A1* | 10/2005 | Mamou et al. | 709/232 |
| 2005/0234986 A1 | 10/2005 | Terek | |
| 2005/0262215 A1 | 11/2005 | Kirov et al. | |
| 2006/0015600 A1 | 1/2006 | Piper | |
| 2006/0031846 A1 | 2/2006 | Jacobs et al. | |
| 2006/0143525 A1 | 6/2006 | Kilian | |
| 2006/0176884 A1 | 8/2006 | Fair | |
| 2006/0209899 A1 | 9/2006 | Cucchi et al. | |
| 2006/0248200 A1 | 11/2006 | Stanev | |
| 2006/0294417 A1 | 12/2006 | Awasthi et al. | |
| 2007/0058669 A1* | 3/2007 | Hoffmann | H04L 29/06 370/466 |
| 2007/0156869 A1 | 7/2007 | Galchev | |
| 2007/0157212 A1* | 7/2007 | Berg | G06F 9/546 719/313 |
| 2007/0162559 A1* | 7/2007 | Biswas | H04L 12/5693 709/216 |
| 2007/0174660 A1 | 7/2007 | Peddada | |
| 2007/0174829 A1* | 7/2007 | Brockmeyer | G06F 8/453 717/151 |
| 2007/0198684 A1* | 8/2007 | Mizushima | 709/223 |
| 2007/0203944 A1 | 8/2007 | Batra et al. | |
| 2007/0245005 A1 | 10/2007 | Banerjee | |
| 2008/0044141 A1 | 2/2008 | Willis et al. | |
| 2008/0098018 A1 | 4/2008 | King | |
| 2008/0098119 A1 | 4/2008 | Jindall | |
| 2008/0098458 A2 | 4/2008 | Smith | |
| 2008/0140844 A1 | 6/2008 | Halpern | |
| 2008/0163124 A1 | 7/2008 | Bonev | |
| 2008/0195664 A1* | 8/2008 | Maharajh et al. | 707/104.1 |
| 2008/0286741 A1 | 11/2008 | Call | |
| 2008/0304423 A1* | 12/2008 | Chuang | H04L 12/4666 370/253 |
| 2008/0316977 A1* | 12/2008 | Malladi | H04L 1/0041 370/335 |
| 2009/0019158 A1 | 1/2009 | Langen | |
| 2009/0024764 A1* | 1/2009 | Atherton et al. | 709/250 |
| 2009/0034537 A1 | 2/2009 | Colrain et al. | |
| 2009/0063734 A1* | 3/2009 | Kurata | G06F 13/4059 710/52 |
| 2009/0103504 A1* | 4/2009 | Inumaru | H04L 12/5602 370/338 |
| 2009/0150647 A1 | 6/2009 | Mejdrich et al. | |
| 2009/0172636 A1 | 7/2009 | Griffith | |
| 2009/0182642 A1 | 7/2009 | Sundaresan | |
| 2009/0327471 A1 | 12/2009 | Astete et al. | |
| 2010/0138208 A1 | 6/2010 | Hattori | |
| 2010/0138531 A1 | 6/2010 | Kashyap | |
| 2010/0198920 A1 | 8/2010 | Wong et al. | |
| 2010/0199259 A1 | 8/2010 | Quinn | |
| 2011/0016123 A1* | 1/2011 | Pandey | G06F 17/30348 707/737 |
| 2011/0022694 A1 | 1/2011 | Dalal et al. | |
| 2011/0022882 A1 | 1/2011 | Jaehde | |
| 2011/0029812 A1 | 2/2011 | Lu et al. | |
| 2011/0047413 A1 | 2/2011 | McGill et al. | |
| 2011/0055510 A1 | 3/2011 | Fritz et al. | |
| 2011/0066737 A1 | 3/2011 | Mallart | |
| 2011/0071981 A1 | 3/2011 | Ghosh et al. | |
| 2011/0082832 A1 | 4/2011 | Vadali et al. | |
| 2011/0119673 A1 | 5/2011 | Bloch | |
| 2011/0161457 A1 | 6/2011 | Sentinelli | |
| 2011/0185021 A1 | 7/2011 | Han | |
| 2011/0228668 A1 | 9/2011 | Pillai et al. | |
| 2011/0246582 A1* | 10/2011 | Dozsa | G06F 9/546 709/206 |
| 2012/0023557 A1 | 1/2012 | Bevan | |
| 2012/0066400 A1 | 3/2012 | Reynolds | |
| 2012/0066460 A1 | 3/2012 | Bihani | |
| 2012/0131330 A1 | 5/2012 | Tonsing | |
| 2012/0144045 A1 | 6/2012 | Revanuru | |
| 2012/0203986 A1* | 8/2012 | Strasser | G06F 3/0611 711/158 |
| 2012/0218891 A1 | 8/2012 | Sundararajan | |
| 2012/0239730 A1 | 9/2012 | Revanuru | |
| 2013/0004002 A1 | 1/2013 | Duchscher | |
| 2013/0014118 A1 | 1/2013 | Jones | |
| 2014/0059226 A1 | 2/2014 | Messerli | |

FOREIGN PATENT DOCUMENTS

| | | |
|---|---|---|
| CN | 101661499 A | 3/2010 |
| GB | 2492653 | 1/2013 |

(56) References Cited

FOREIGN PATENT DOCUMENTS

| JP | 2000-339287 | 12/2000 |
|---|---|---|
| JP | 2003196229 | 7/2003 |
| JP | 2007-226398 | 9/2007 |
| JP | 2010128911 | 6/2010 |
| WO | 2006046972 | 5/2006 |

OTHER PUBLICATIONS

National Instruments Corporation, What is Scatter-Gather DMA (Direct Memory Access)?, Jul. 22, 2010.*
Informatica PowerChannel User Guide, Dec. 2012.*
International Search Report dated Dec. 6, 2011, International Application No. PCT/US2011/051697 filed Sep. 15, 2011, 3 pages.
International Search Report dated Dec. 6, 2011, International Application No. PCT/US2011/051459 filed Sep. 13, 2011, 3 pages.
International Search Report and Written Opinion dated Dec. 6, 2011, International Application No. PCT/US2011/051697, 11 pgs.
International Search Report and Written Opinion dated Dec. 6, 2011, International Application No. PCT/US2011/051459, 9 pgs.
International Searching Authority at the European Patent Office, International Search Report Written Opinion for PCT International Patent Application PCT/US2013/067286, dated Feb. 5, 2014, 10 pages.
Baldwin, The ByteBuffer Class in Java, Aug. 20, 2002, 14 pages. Retrieved from: developer.com.
State Intellectual Property Office of the People's Republic of China Search Report dated Dec. 15, 2015 for Chinese Application No. 201180039809.X, 2 pages.
State Intellectual Property Office of the People's Republic of China Search Report dated Dec. 18, 2015 for Chinese Application No. 201180039804.7, 2 pages.
European Patent Office, Examining Division, Examination Report dated Nov. 16, 2016 for European Patent Application No. 13789928.2, 8 Pages.
European Patent Office, Substantive Examination Report dated May 29, 2017 for European Patent Application No. 13789928.2, 10 Pages.

* cited by examiner

SYSTEM AND METHOD FOR PROVIDING SCATTER/GATHER DATA PROCESSING IN A MIDDLEWARE ENVIRONMENT

CLAIM OF PRIORITY

This application claims the benefit of priority to U.S. Provisional Patent Application titled "MIDDLEWARE MACHINE PLATFORM", Application No. 61/383,285, filed Sep. 15, 2010; and U.S. Provisional Patent Application titled "MIDDLEWARE MACHINE PLATFORM", Application No. 61/384,227, filed Sep. 17, 2010, each of which applications are herein incorporated by reference.

CROSS REFERENCE TO RELATED APPLICATIONS

This application is related to U.S. Patent Application titled "SYSTEM AND METHOD FOR ZERO BUFFER COPYING IN A MIDDLEWARE ENVIRONMENT", application Ser. No. 13/109,849, filed May 17, 2011, now U.S. Pat. No. 8,856,460, issued Oct. 7, 2014; U.S. Patent Application titled "SYSTEM AND METHOD FOR PARALLEL MUXING BETWEEN SERVERS IN A CLUSTER", application Ser. No. 13/109,871, filed May 17, 2011, now U.S. Pat. No. 8,756,329, issued Jun. 17, 2014; and U.S. Patent Application titled "SYSTEM AND METHOD FOR SUPPORTING LAZY DESERIALIZATION OF SESSION INFORMATION IN A SERVER CLUSTER", application Ser. No. 13/167,636, filed Jun. 23, 2011, now U.S. Pat. No. 9,811,541, issued Nov. 7, 2017; each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to systems and methods for scatter/gather data processing in a middleware environment.

BACKGROUND

Within any large organization, over the span of many years the organization often finds itself with a sprawling IT infrastructure that encompasses a variety of different computer hardware, operating-systems, and application software. Although each individual component of such infrastructure might itself be well-engineered and well-maintained, when attempts are made to interconnect such components, or to share common resources, it is often a difficult administration task. In recent years, organizations have turned their attention to technologies such as virtualization and centralized storage, and even more recently cloud computing, which can provide the basis for a shared infrastructure. However, there are few all-in-one platforms that are particularly suited for use in such environments. These are the general areas that embodiments of the invention are intended to address.

SUMMARY

Systems and methods are provided for providing scatter/gather data processing in a middleware environment. In accordance with an embodiment, such a system can include a cluster of one or more high performance computing systems, each including one or more processors and a high performance memory. The cluster communicates over an InfiniBand network. The system can also include a middleware environment, executing on the cluster, that includes one or more application server instances. The system can further include a plurality of multiplexers (hereinafter referred to as a muxer). Each application server instance includes at least one muxer, and each muxer is operable to collect data from a plurality of locations in the high performance memory, and transfer the data in bulk.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

As described above, in recent years, organizations have turned their attention to technologies such as virtualization and centralized storage, and even more recently cloud computing, which can provide the basis for a shared infrastructure. However, there are few all-in-one platforms that are particularly suited for use in such environments. Described herein is a system and method for providing a middleware machine or similar platform (referred to herein in some implementations as "Exalogic"), which comprises a combination of high performance hardware, together with an application server or middleware environment, and additional features, to provide a complete Java EE application server complex which includes a massively parallel in-memory grid, can be provisioned quickly, and can scale on demand.

In particular, as described herein, systems and methods are provided for providing scatter/gather data processing in a middleware environment. In accordance with an embodiment, a such a system can include a cluster of one or more high performance computing systems, each including one or more processors and a high performance memory. The cluster communicates over an InfiniBand network. The system can also include a middleware environment, executing on the cluster, that includes one or more application server instances. The system can further include a plurality of muxers. Each application server instance includes at least one muxer, and each muxer is operable to collect data from a plurality of locations in the high performance memory, and transfer the data in bulk.

Typically, the memory space in a computer system is fragmented. That is, related pieces of data are generally not stored in a single contiguous area, but rather are spread throughout the memory space. The process of writing the data to the various locations in memory where it is stored is referred to as scattering. Similarly, the processing of reading the data from the various locations in memory where it is stored is referred to as gathering. In a typical system, limited by a relatively low maximum transfer unit (MTU), each piece of data may be scattered and gathered individually, or in small groups. However, in accordance with an embodiment, the system can obtain pointers to all of the pieces of data and perform a single bulk write. Because writing each piece of data separately can require many context switches for the CPU, by writing in bulk context switching is greatly reduced and system performance, particularly latency, is improved. Additionally, writing in bulk better utilizes the available bandwidth, making the system more efficient. In accordance with an embodiment, the increase in bandwidth, and the concomitant increase in MTU, provides significant system improvements, in particular it minimizes context switching which is CPU intensive. Instead of data transfers that require multiple round trips, and therefore multiple context switches, over many iterations, the same data transfer can be accomplished in only a few, or even a single, iteration.

Figure 1:
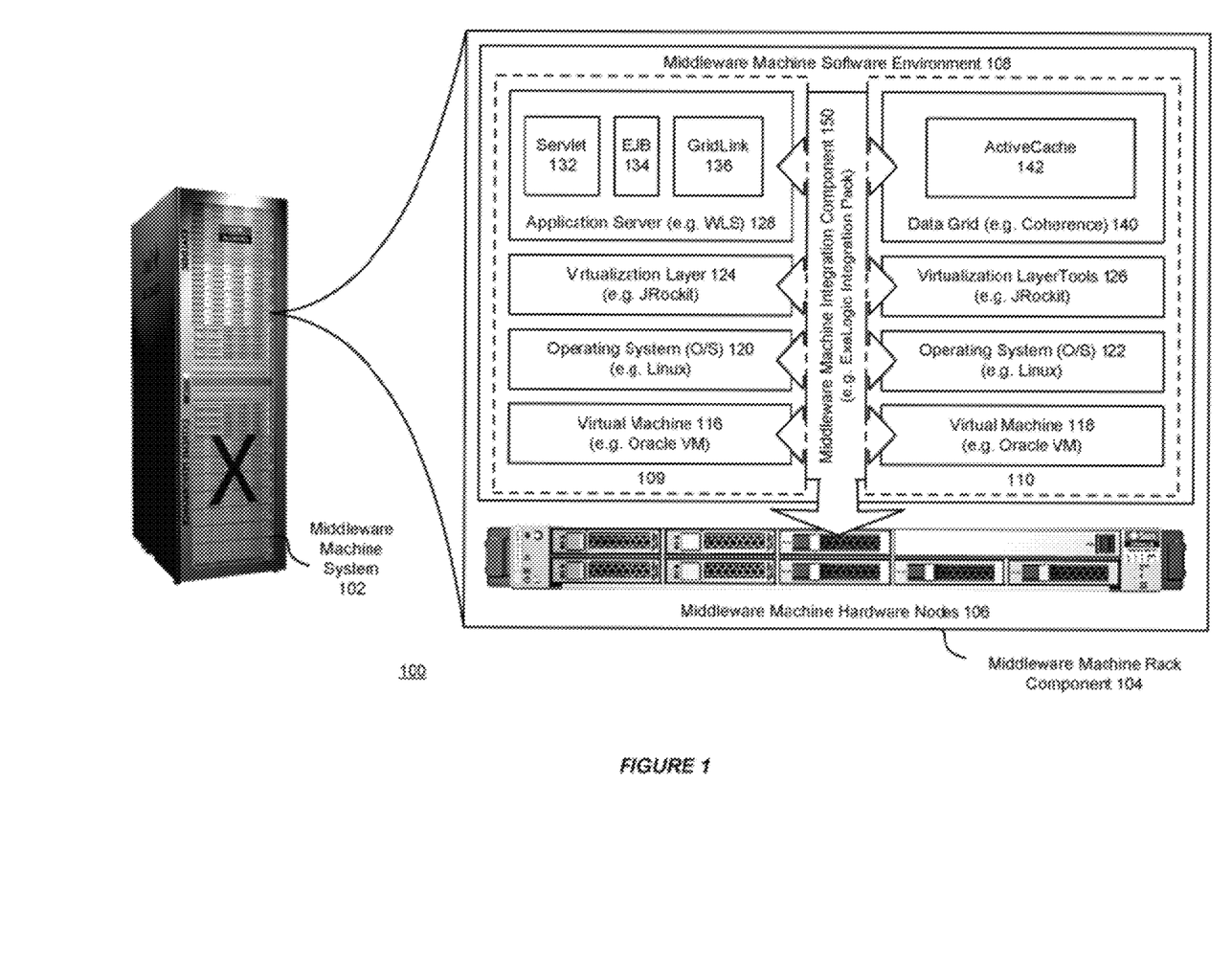
FIG. 1 shows an illustration of a middleware machine environment, in accordance with an embodiment.

FIG. 1 shows an illustration of a middleware machine environment 100, in accordance with an embodiment. As shown in FIG. 1, each middleware machine system 102 includes several middleware machine rack components 104, each of which includes a combination of high-performance middleware machine hardware nodes 106 (e.g., 64-bit processors, high performance large memory, and redundant InfiniBand and Ethernet networking), and a middleware machine software environment 108. The result is a complete application server environment which can be provisioned in minutes rather than days or months, and which can scale on demand. In accordance with an embodiment, each middleware machine system can be deployed as a full, half, or quarter rack, or other configuration of rack components, and several middleware machine systems can be coupled together, again using InfiniBand, to create larger environments. Each middleware machine software environment can be provisioned with several application server or other software instances, for example as shown in FIG. 1, an application server instance 109 could comprise a virtual machine 116, operating system 120, virtualization layer 124, and application server layer 128 (e.g. WebLogic, including servlet 132, EJB 134, and Gridlink 136 containers); while another application server instance 110 could comprise a virtual machine 118, operating system 122, virtualization layer 126, and data grid layer 140 (e.g. Coherence, including an active cache 142). Each of the instances can communicate with one another, and with both its middleware machine hardware node, and other nodes, using a middleware machine integration component 150, such as an ExaLogic integration pack, which itself provides several optimization features, such as support for InfiniBand and other features, as described in further detail below.

Figure 2:
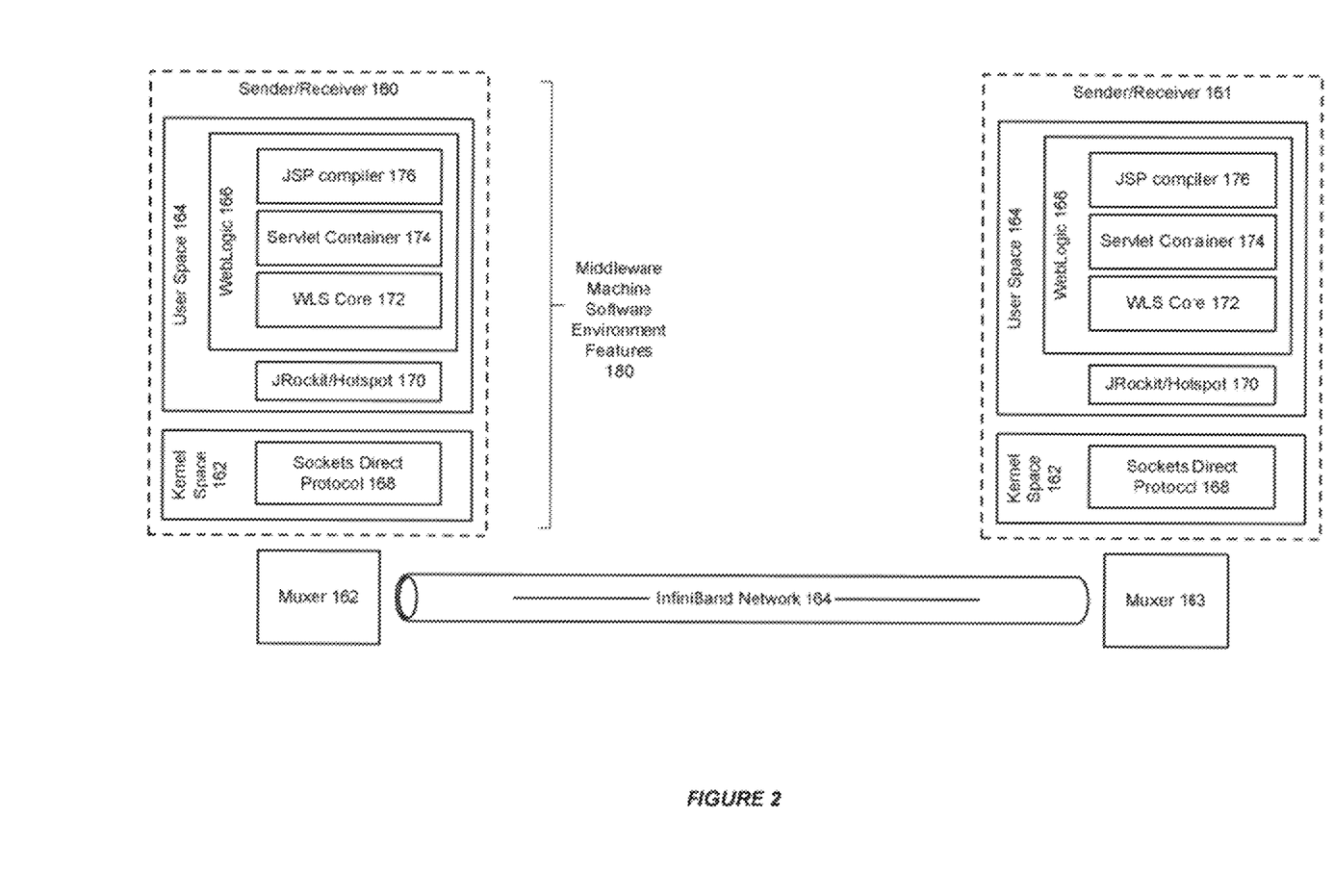
FIG. 2 shows another illustration of a middleware machine platform or environment, in accordance with an embodiment.

FIG. 2 shows another illustration of a middleware machine platform or environment, in accordance with an embodiment. As shown in FIG. 2, each application server instance can act as a sender and/or receiver 160, 161 within the middleware machine environment. Each application server instance is also associated with a muxer 162, 163, that allows application servers to communicate with one another via an InfiniBand network 164. In the example shown in FIG. 2, an application server instance can include middleware machine software environment features 180 such as a kernel space 162, user space 164, and application server (e.g. WebLogic space) 166, which in turn can includes a sockets direct protocol 168, JVM (e.g. JRockit/Hotspot layer) 170, WLS core 172, servlet container 174, and JSP compiler 176. In accordance with other examples, other combinations of middleware-type software can be included. In accordance with various embodiments, the machine integration component can provide features such as Zero Buffer Copies, Scatter/Gather I/O, T3 Connections, Lazy Deserialization, and GridLink DataSource, to provide the basis for, and improve performance within, the shared infrastructure.

Scatter/Gather I/O

In accordance with an embodiment, the system can use Scatter/Gather I/O, which minimizes fragmentation of network packets, allowing the OS to perform fragmentation based on the use of Java New I/O (NIO). Additionally, in accordance with an embodiment, the system uses Internet Protocol over InfiniBand (IPoIB) protocol, which has a maximum transfer unit (MTU) of 64 KB. By comparison, Ethernet has an MTU of 1.5 KB. Using IPoIB allows the application server, e.g. WebLogic Server, to write more data at a time. Additionally, typical Ethernet connections provide speeds on the order of 1 Gb/s, however, by using an InfiniBand network, speeds of upwards of 40 Gb/s are available. This provides greater flexibility and allows much more data to be passed through the connection. Ideally, the system that utilizes such a connection can adapt to push more data through the network to saturate, and efficiently use, the available bandwidth.

Figure 3:
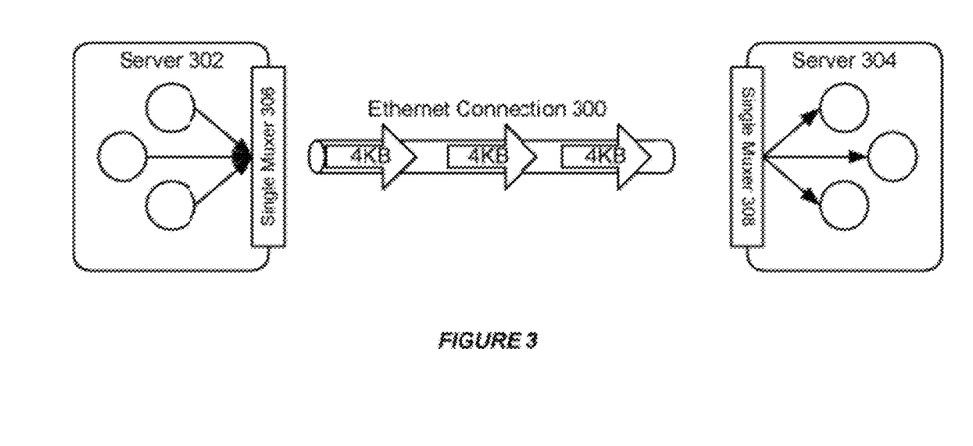
FIG. 3 shows a system that utilizes Ethernet protocol, in accordance with an embodiment.

FIG. 3 shows a system that utilizes Ethernet protocol, in accordance with an embodiment. In a system that utilizes an Ethernet network 300, data can only be written in relatively small portions. As shown in FIG. 3, server 302 is connected to server 304 via an Ethernet network 300. The two servers communicate across a single channel using single muxers 306 and 308. Data transmissions are limited by the Ethernet connection which, as shown in FIG. 3, force the servers to communicate in 4 KB chunks. Attempts to transmit more data than this at a time, and the capacity of the network will be exceeded. This forces more work to be performed at the kernel level, specifically the kernel level divides the data into smaller units and imposes flow control on the fly. This can be costly in time and resources.

Figure 4:
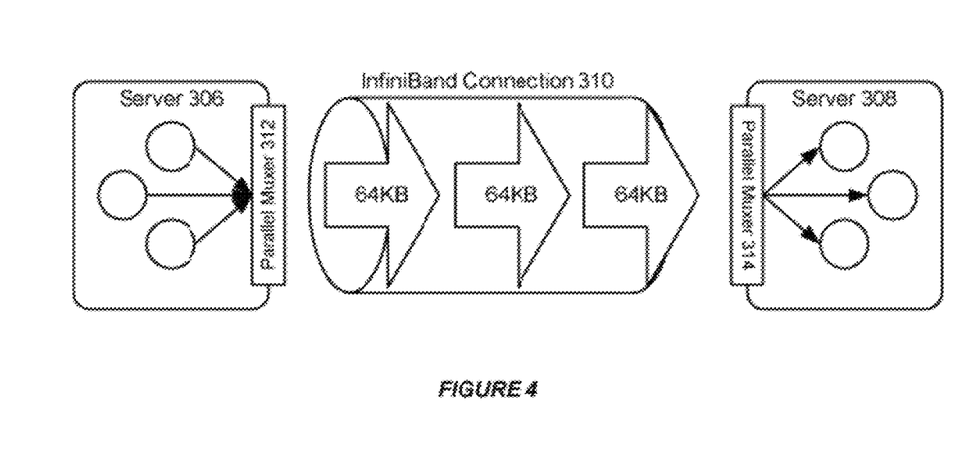
FIG. 4 shows a system that utilizes IPoIB and parallel muxing, in accordance with an embodiment.

FIG. 4 shows a system that utilizes IPoIB and parallel muxing, in accordance with an embodiment. As described above, the InfiniBand network provides greater bandwidth compared to typical Ethernet connections. This greater bandwidth allows for a larger MTU to be used. As shown in FIG. 4, server 306 is connected to server 308 over an InfiniBand network 310. By utilizing the greater bandwidth available through InfiniBand, the system can push data through in much larger, as compared to Ethernet, 64 KB chunks. In such a system, the kernel level recognizes the increased bandwidth and pushes the larger data units without performing the additional work of further dividing the data into smaller units and imposing flow control.

In accordance with an embodiment, within a cluster, multiple parallel logical connections, i.e., channels, can be used between servers. This allows for more data to be passed between servers concurrently, enabling multiple threads to execute in parallel. As shown in FIG. 4, each server utilizes a parallel muxer, 312 and 314, which can manage the various connections to ensure that the multiple threads do not interfere with, or block, one another. This further improves the use of the available bandwidth improving the efficiency of data transfers between servers.

Figure 5:
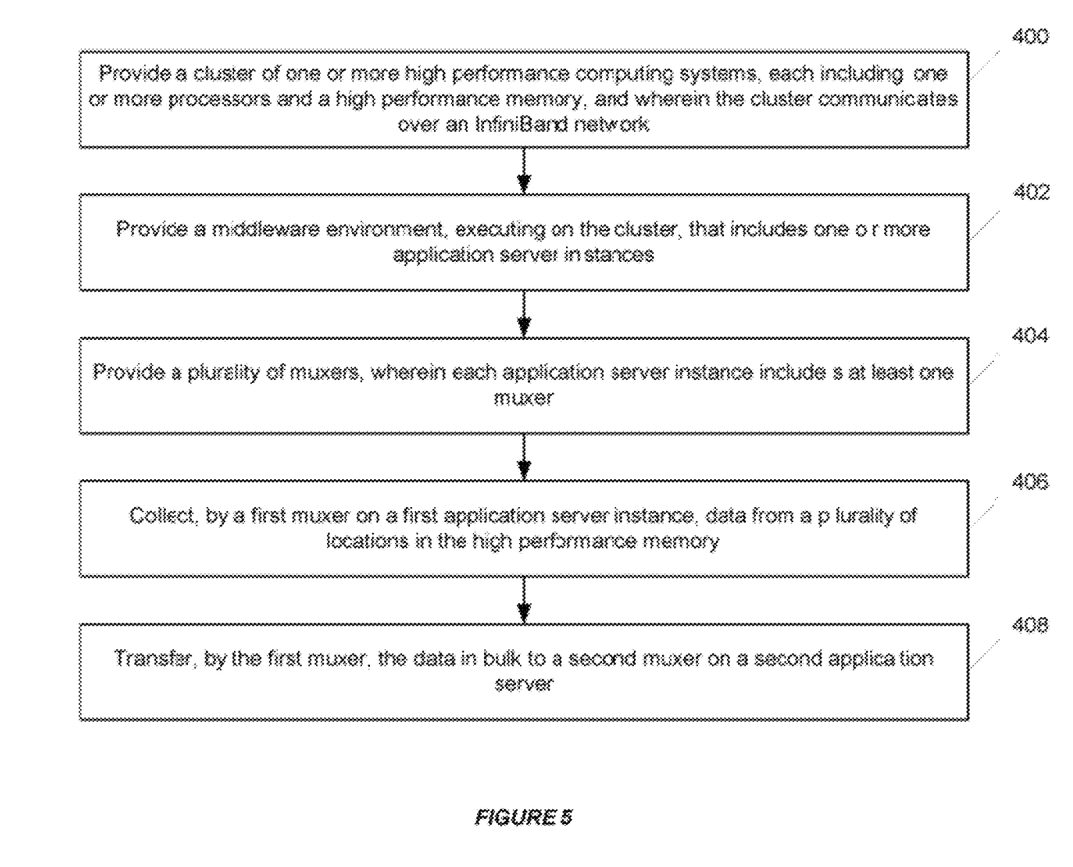
FIG. 5 shows a flowchart of a method for providing scatter/gather I/O in accordance with an embodiment.

FIG. 5 shows a flowchart of a method for providing scatter/gather I/O in accordance with an embodiment. At step 400, a cluster of one or more high performance computing systems is provided. Each high performance computing system can include one or more processors and a high performance memory. The cluster can communicate over an InfiniBand network. At step 402, a middleware environment, executing on the cluster, that includes one or more application server instances is provided. At step 404, a plurality of muxers are provided. Each application server instance includes at least one muxer. At step 406, a first muxer, on a first application server instance, collects data from a plurality of locations in the high performance memory. At step 408, the first muxer transfers the data in bulk to a second muxer on a second application server.

In accordance with an embodiment, the method shown in FIG. 4 can further include comprising managing, by each muxer, a plurality of threads transmitting data across a plurality of parallel channels. A user can configure how many parallel channels are included in the plurality of parallel channels. Additionally, as described above, each muxer can be a New I/O (NIO) muxer. Further, each data transfer can use scatter/gather data processing.

The present invention can be conveniently implemented using one or more conventional general purpose or specialized digital computer, computing device, machine, or microprocessor, including one or more processors, memory and/or non-transitory computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a computer readable storage medium (media) having instructions stored thereon/in which can be used to program a computer to perform any of the processes of the present invention. The computer readable storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing scatter/gather data processing, comprising:
   a plurality of microprocessors including a first microprocessor and a second microprocessor;
   a cluster of a plurality of application server instances executing on the plurality of microprocessors,
      wherein a first application server instance of the plurality of application server instances executes on the first microprocessor, and a second application server instance of the plurality of application server instances executes on the second microprocessor;
      wherein the first application server instance and the second application server instance communicate through a switch fabric network;
      wherein each application server instance includes a software muxer;
   a plurality of parallel logical channels between the first application server instance and the second application server instance,
      wherein each parallel logical channel is created based on a replication channel template configured on a cluster management bean, and
      wherein the number of the plurality of parallel logical channels is specified by an attribute in a server management bean;
   wherein the first microprocessor executes the software muxer on the first application server instance to
      obtain a plurality of pointers, wherein each pointer points to one or more of a plurality of pieces of data, wherein the plurality of pieces of data are stored in different locations in a memory allocated to the first application server instance,
      configure a plurality of threads to execute the plurality of parallel logical channels,
      collect the plurality of pieces of data from the different locations in the memory using the plurality of pointers, and
      transfer, in a single bulk write and using a single context switch of the first microprocessor, the plurality of pieces of data collected using the plurality of pointers concurrently over the plurality of parallel logical channels from the first application server instance to the second application server instance.

2. The system of claim 1 wherein each muxer is a New I/O (NIO) muxer.

3. The system of claim 1, further comprising a utility function configured to determine whether the plurality of parallel logical channels have been configured, and cache a result of the determination for subsequent use.

4. The system of claim 1, wherein the first application server instance, at a kernel level, operates to recognize an increased bandwidth and transfers the data without imposing a flow control.

5. The system of claim 1, wherein the first muxer is a parallel muxer.

6. The system of claim 1, wherein the plurality of pieces of data are related to one another.

7. The system of claim 1, wherein the memory allocated to the first application server instance is a high performance memory.

8. A method for providing scatter/gather data processing, comprising:
configuring a cluster of a plurality of application server instances executing on a plurality of microprocessors including a first microprocessor and a second microprocessor, wherein each application server instance includes a software muxer, wherein a first application server instance of the plurality of application server instances executes on the first microprocessor, and a second application server instance of the plurality of application server instances executes on the second microprocessor;
wherein the first application server instance and the second application server instance communicate through a switch fabric network;
configuring a plurality of parallel logical channels between the first application server instance and the second application server instance,
wherein each parallel logical channel is created based on a replication channel template configured on a cluster management bean, and
wherein the number of the plurality of parallel logical channels is specified by an attribute in a server management bean;
executing, by the first microprocessor the software muxer on the first application server instance to perform the steps comprising
obtaining a plurality of pointers, wherein each pointer points to one or more of a plurality of pieces of data, wherein the plurality of pieces of data are stored in different locations in a memory allocated to the first application server instance,
configuring a plurality of threads to execute the plurality of parallel logical channels,
collecting the plurality of pieces of data from the different locations in the memory using the plurality of pointers,
transferring, in a single bulk write and using a single context switch of the first microprocessor, the plurality of pieces of data collected using the plurality of pointers concurrently over the plurality of parallel logical channels from the first application server instance to the second application server instance.

9. The system of claim 8 wherein each muxer is a New I/O (NIO) muxer.

10. The method of claim 8, further comprising determining, via a utility function, whether the plurality of parallel logical channels have been configured, wherein a result of the determination is cached for subsequent use.

11. The method of claim 8, wherein the first application server instance, at a kernel level, operates to recognize an increased bandwidth and transfers the data without imposing a flow control.

12. The method of claim 8, wherein the first muxer is a parallel muxer.

13. The method of claim 8, wherein the plurality of pieces of data are related to one another.

14. The method of claim 8, wherein the memory allocated to the first application server instance is a high performance memory.

15. A non-transitory computer readable storage medium including instructions stored thereon which, when executed by a computer, cause the computer to perform the steps comprising:
configuring a cluster of a plurality of application server instances executing on a plurality of microprocessors including a first microprocessor and a second microprocessor, wherein each application server instance includes a software muxer, wherein a first application server instance of the plurality of application server instances executes on the first microprocessor, and a second application server instance of the plurality of application server instances executes on the second microprocessor;
wherein the first application server instance and the second application server instance communicate through a switch fabric network;
configuring a plurality of parallel logical channels between the first application server instance and the second application server instance,
wherein each parallel logical channel is created based on a replication channel template configured on a cluster management bean, and
wherein the number of the plurality of parallel logical channels is specified by an attribute in a server management bean;
executing, by the first microprocessor the software muxer on the first application server instance to perform the steps comprising
obtaining a plurality of pointers, wherein each pointer points to one or more of a plurality of pieces of data, wherein the plurality of pieces of data are stored in different locations in a memory allocated to the first application server instance,
configuring a plurality of threads to execute the plurality of parallel logical channels,
collecting the plurality of pieces of data from the different locations in the memory using the plurality of pointers,
transferring, in a single bulk write and using a single context switch of the first microprocessor, the plurality of pieces of data collected using the plurality of pointers concurrently over the plurality of parallel logical channels from the first application server instance to the second application server instance.

16. The non-transitory computer readable storage medium of claim 15 wherein each muxer is a New I/O (NIO) muxer.

17. The non-transitory computer readable storage medium of claim 15, further comprising determining, via a utility function, whether the plurality of parallel logical channels have been configured, wherein a result of the determination is cached for subsequent use.

18. The non-transitory computer readable storage medium of claim 15, wherein the first application server instance, at a kernel level, operates to recognize an increased bandwidth and transfers the data without imposing a flow control.

19. The non-transitory computer readable storage medium of claim 15, wherein the first muxer is a parallel muxer.

20. The non-transitory computer readable storage medium of claim 15, wherein the plurality of pieces of data are related to one another.

21. The non-transitory computer readable storage medium of claim 15, wherein the memory allocated to the first application server instance is a high performance memory.

* * * * *

UNITED STATES PATENT AND TRADEMARK OFFICE
CERTIFICATE OF CORRECTION

PATENT NO. : 9,864,759 B2
APPLICATION NO. : 13/170490
DATED : January 9, 2018
INVENTOR(S) : Bihani et al.

It is certified that error appears in the above-identified patent and that said Letters Patent is hereby corrected as shown below:

On the Title Page

Column 2, in the Abstract, Line 3, delete "a such a" and insert -- such a --, therefor.

On Page 3 Column 2, under Other Publications, Line 3, after "Report" insert -- and --.

In the Drawings

On sheet 4 of 4, in FIGURE 5, under Reference Numeral 402, Line 1, delete "o r" and insert -- or --, therefor.

On sheet 4 of 4, in FIGURE 5, under Reference Numeral 404, Line 1, delete "include s" and insert -- includes --, therefor.

On sheet 4 of 4, in FIGURE 5, under Reference Numeral 406, Line 1, delete "p lurality" and insert -- plurality --, therefor.

On sheet 4 of 4, in FIGURE 5, under Reference Numeral 408, Line 1, delete "applica tion" and insert -- application --, therefor.

In the Specification

Column 3, Line 7, delete "a such a" and insert -- such a --, therefor.

In the Claims

Column 7, Line 48, in Claim 9, delete "system" and insert -- method --, therefor.

Signed and Sealed this
Ninth Day of July, 2019

Andrei Iancu
*Director of the United States Patent and Trademark Office*